(12) United States Patent
Wang et al.

(10) Patent No.: US 10,935,266 B2
(45) Date of Patent: Mar. 2, 2021

(54) SYSTEM AND METHOD FOR OCCUPANCY-DRIVEN REGISTER AIRFLOW CONTROL

(71) Applicant: THE RESEARCH FOUNDATION FOR THE STATE UNIVERSITY OF NEW YORK, Albany, NY (US)

(72) Inventors: Ya Wang, Albany, NY (US); Zhangjie Chen, Albany, NY (US)

(73) Assignee: The Research Foundation for The State University of New York, Albany, NY (US)

(*) Notice: Subject to any disclaimer, the term of this patent is extended or adjusted under 35 U.S.C. 154(b) by 0 days.

(21) Appl. No.: 16/603,983

(22) PCT Filed: Apr. 10, 2018

(86) PCT No.: PCT/US2018/026864
§ 371 (c)(1),
(2) Date: Oct. 9, 2019

(87) PCT Pub. No.: WO2018/191251
PCT Pub. Date: Oct. 18, 2018

(65) Prior Publication Data
US 2020/0116371 A1    Apr. 16, 2020

Related U.S. Application Data

(60) Provisional application No. 62/483,566, filed on Apr. 10, 2017.

(51) Int. Cl.
*F24F 13/06* (2006.01)
*F24F 13/10* (2006.01)
(Continued)

(52) U.S. Cl.
CPC .............. *F24F 11/30* (2018.01); *F24F 11/56* (2018.01); *F24F 11/62* (2018.01);
(Continued)

(58) Field of Classification Search
CPC . F24F 11/30; F24F 11/56; F24F 11/62; G05B 15/02
See application file for complete search history.

(56) References Cited

U.S. PATENT DOCUMENTS 4,783,045 A    11/1988  Tartaglino
6,629,886 B1 * 10/2003  Estepp .................. F24F 11/745
                                                                454/229
(Continued)

OTHER PUBLICATIONS

Editor, Panasonic's New Grid-Eye Sensor, Oct. 12, 2012, https://www.designworldonline.com/panasonics-new-grid-eye-sensor/ (Year: 2012).*

(Continued)

*Primary Examiner* — Mark A Connolly
(74) *Attorney, Agent, or Firm* — Scully, Scott, Murphy & Presser, P.C.

(57) ABSTRACT

An HVAC register airflow control system and an air flow control method are provided. A housing of the system is in fluid communication with an air source for supplying an airflow. The housing includes an air outlet to the enclosed space. A detection sensor detects occupancy information of the enclosed space. A controller generates a control signal based on the occupancy information and controls the shape change of a damper made of a shape memory material. The damper is controlled to switch between a first operative configuration for preventing the airflow from entering the enclosed space and a second operative configured for permitting the airflow to enter the enclosed space.

19 Claims, 5 Drawing Sheets

(51) Int. Cl.
*F24F 11/30* (2018.01)
*F24F 11/56* (2018.01)
*F24F 11/62* (2018.01)
*F24F 120/10* (2018.01)
*F24F 110/10* (2018.01)
*G05B 15/02* (2006.01)

(52) U.S. Cl.
CPC ....... *F24F 2110/10* (2018.01); *F24F 2120/10* (2018.01); *G05B 15/02* (2013.01); *G05B 2219/2614* (2013.01)

(56) References Cited

U.S. PATENT DOCUMENTS

| | | | |
|---|---|---|---|
| 7,517,279 B2 * | 4/2009 | Kober | B60H 1/34 454/152 |
| 8,086,352 B1 | 12/2011 | Elliott | |
| 2005/0121946 A1 | 6/2005 | McKnight et al. | |
| 2009/0186572 A1 * | 7/2009 | Farrell | F24F 13/06 454/256 |
| 2010/0164713 A1 * | 7/2010 | Wedig | G08B 7/066 340/539.13 |
| 2013/0037252 A1 * | 2/2013 | Major | B60H 1/00842 165/202 |
| 2016/0003493 A1 | 1/2016 | Katz | |
| 2017/0229073 A1 * | 8/2017 | Ficner | H05B 47/105 |
| 2017/0370366 A1 * | 12/2017 | Johnson | F24F 11/30 |
| 2018/0348058 A1 * | 12/2018 | Munir | G01J 5/0025 |

OTHER PUBLICATIONS

International Search Report dated Jul. 5, 2018 issued in PCT/US2018/026864.

* cited by examiner

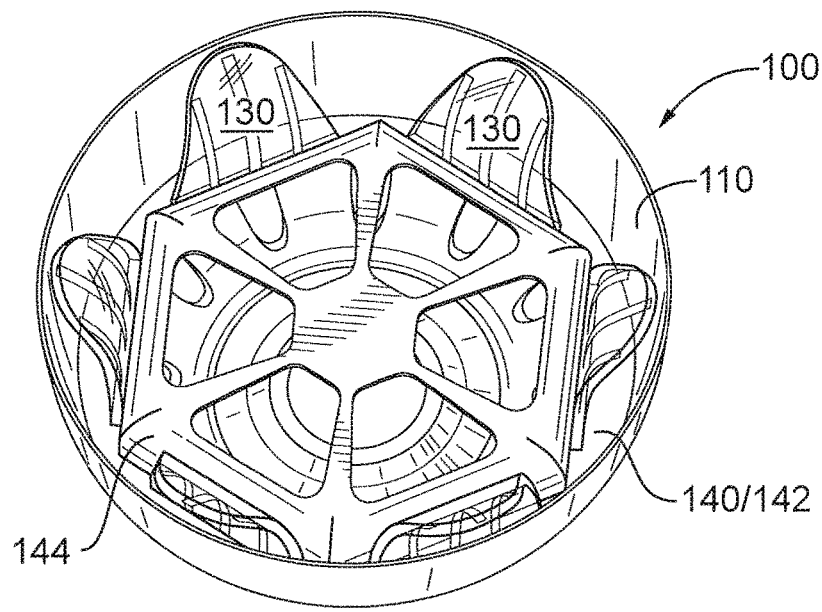
FIG. 3
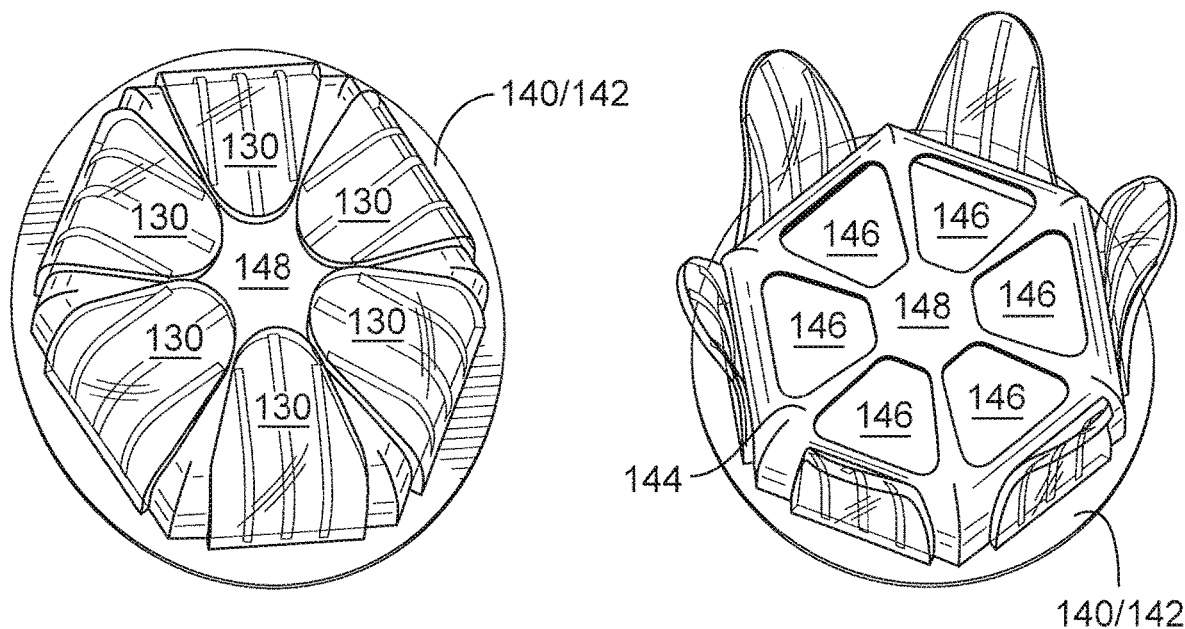
FIG. 4
FIG. 5

SYSTEM AND METHOD FOR OCCUPANCY-DRIVEN REGISTER AIRFLOW CONTROL

CROSS-REFERENCE TO RELATED APPLICATIONS

This application claims the benefit of U.S. Provisional Application No. 62/483,566 filed on Apr. 10, 2017, the entire contents of which is incorporated herein by reference.

GOVERNMENT SUPPORT STATEMENT

This invention was made with government support under grant number AR0000531 awarded by the Department of Energy. The government has certain rights in the invention.

BACKGROUND

The present disclosure relates generally to automatic control systems and methods for heating, ventilation and cooling (HVAC) systems of an enclosed space, such as, a residential or commercial building. More particularly, the present disclosure relates to an automatic control system and method based on occupancy-driven shape memory alloy (SMA) damper registers, which are capable of achieving energy-efficiency.

In general, an automated heating, ventilation and cooling system is the largest source of building energy consumption. (Energy Policy Branch Energy Sector Energy Forecasting Division. Canada's Energy Outlook, 1996-2020. Natural Resources Canada, 1997; Energy Information Administration 2009 Residential Energy Consumption Survey. http://www.eia.doe.gov/emeu/recs/contents.html). By closing off some air vents, during certain hours of the day, up to 7.5% building energy consumption could be saved.

Consequently, so-called smart vent registers have been developed, which are capable of turning the air vents on and off through smart phone applications. However, these products do not have on-board occupancy sensors and are therefore open-loop. Furthermore, the vent control is achieved by simply positioning the vent blade through a motor and a controller without involving any smart actuation materials.

Accordingly, there exists a need in the art to at least overcome the deficiencies and limitations described hereinabove with respect to the conventional vent registers.

SUMMARY

According to an exemplary aspect of the present disclosure, an HVAC register airflow control system used for an enclosed space is provided. The system includes a housing in fluid communication with an air source for supplying an airflow. The housing includes at least one air outlet to the enclosed space. The system further includes a detection sensor configured to detect occupancy information of the enclosed space. The system also includes a controller in wired or wireless communication with the detection sensor and configured to generate a control signal based on the occupancy information of the enclosed space. The system additional includes at least one damper, which includes a shape memory material and configured to interact with the at least one air outlet. The at least one damper includes a first operative configuration and a second operative configuration bath provided by the shape memory material. In the first operative configuration, the at least one damper interacts with the at least one air outlet to prevent the airflow supplied by the air source from entering the enclosed space. In the second operative configuration, the at least one damper interacts with the at least one air outlet to permit the airflow supplied by the air source to enter the enclosed space. The at least one damper switches between the first operative configuration and the second operative configuration based on the control signal.

According to another exemplary aspect of the present disclosure, a method of controlling airflow in an enclosed space by using an HVAC register is provided. According to the method, occupancy information of the enclosed space is determined. A control signal is generated based on the detected occupancy information. Based on the control signal, at least one damper is switched between a first operative configuration thereof and a second operative configuration thereof. The at least one damper includes a shape memory material for providing the first operative configuration and the second operative configuration. The at least one damper is configured to interact with at least one air outlet in fluid communication with an air source for supplying an airflow into the enclosed space. In the first operative configuration, the at least one damper interacts with the at least one air outlet to prevent the airflow from entering the enclosed space and in the second operative configuration, the at least one damper interacts with the at least one air outlet to peanut the airflow to enter the enclosed space.

These and other aspects and advantages of the current disclosure will become apparent from the following detailed description considered in conjunction with the accompanying drawings. It is to be understood, however, that the drawings are designed solely for purposes of illustration and not as a definition of the limits of the disclosure, for which reference should be made to the appended claims. Moreover, the drawings are not necessarily drawn to scale and, unless otherwise indicated, they are merely intended to conceptually illustrate the structures and procedures described herein.

BRIEF DESCRIPTION OF THE DRAWINGS

FIG. 3 is an alternative top perspective view of the HVAC register airflow control system shown in FIG. 1;

FIG. 4 is a partial top perspective view of the HVAC register airflow control system shown in FIG. 1;

FIG. 5 is an alternative partial top perspective view of the HVAC register airflow control system shown in FIG. 1;

DETAILED DESCRIPTION OF EXEMPLARY EMBODIMENTS

Detailed embodiments of the present disclosure are described herein; however, it is to be understood that the disclosed embodiments are merely illustrative of the compositions, structures and methods of the disclosure that may be embodied in various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the compositions, structures and methods disclosed herein. References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment.

Figure 1:
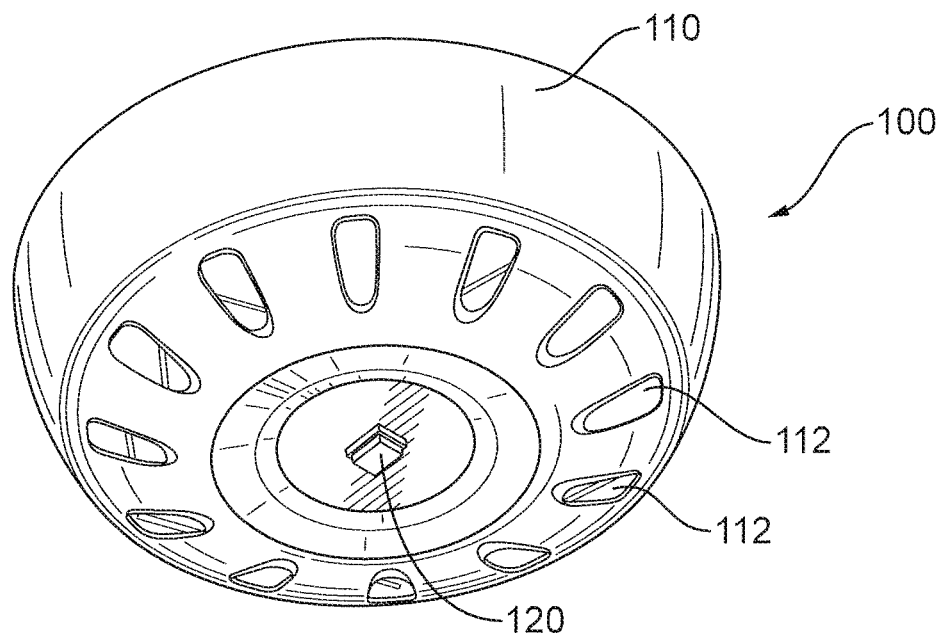
FIG. 1 is a bottom perspective view of an HVAC register airflow control system according to an exemplary embodiment of the present disclosure.

FIG. 1 is a bottom perspective view of an HVAC register airflow control system 100 according to an exemplary embodiment of the present disclosure. The HVAC register airflow control system 100 is used for an enclosed space, such as, a room or suite of a residential or commercial building, or a warehouse. However, the enclosed space, to which the HVAC register airflow control system 100 can be suitably used, is not limited to a specific size of the space or a particularly zoning system of the space. It is within the scope of the disclosure for using multiple HVAC register airflow control systems, coupled in parallel and/or tandem with each other, for the purpose of achieving desirable control of any enclosed space, dependent upon factors including but not limited to size of the enclosed space, the zoning system of the enclosed space and/or the working range of each HVAC register airflow control system. In addition, the one or more HVAC register airflow control systems can be used in a retrofittable manner to substitute or supplement the existing control systems, including existing registers, to improve the control of air flow.

As shown in FIG. 1, the HVAC register airflow control system 100 includes a housing 110, which is in fluid communication with an air source of an HVAC system of the enclosed space for supplying airflow. The housing 110 includes at least one air outlet 112, which allows the air flow from the air source to enter the enclosed space. In the shown embodiment, the housing 110 is substantially circular and multiple air outlets 112 are centro-symmetrical with respect to the center of the circular housing 112.

The HVAC register airflow control system 100 further includes a detection sensor 120, which is configured to detect occupancy information of the enclosed space. For example, the detection sensor 120 can be disposed at a lower end of the housing 110 and aligned with the center of the circular housing. The detection sensor 120 can be a Grid-EYE® sensor array. The Grid-EYE® sensor is an advanced thermopile detection sensor, which includes 8×8 (64) pixel infrared sensor array and an additional thermistor to provide reference signals. The detection sensor 120 can read temperatures and additionally process thermal image information to provide the occupancy information, which includes at least one of the number of one or more occupants within the enclosed space, the positions of the one or more occupants within the enclosed space, and the moving directions of the one or more occupants.

In addition, the occupancy detection sensor 120 can be integrated and retrofitted to the existing vent system of the HVAC system. The occupancy detection sensor 120 also works together with an MCU evaluation board, an LCD display and other associated components, such as Bluetooth® modules, for establishing wireless data communication with the building automation system (BAS) of the enclosed space. Software based on LabVIEW® and MATLAB® has also been developed for data acquisition and analysis.

The HVAC register airflow control system 100 further includes a controller, which can be in wired or wireless communication with the detection sensor 120 and is configured to generate a control signal based on the occupancy information of the enclosed space. For example, the controller can be integrated with the detection sensor 120, provided within or adjacent the housing 110, or even provided remotely with respect to the housing 110.

Figure 2:
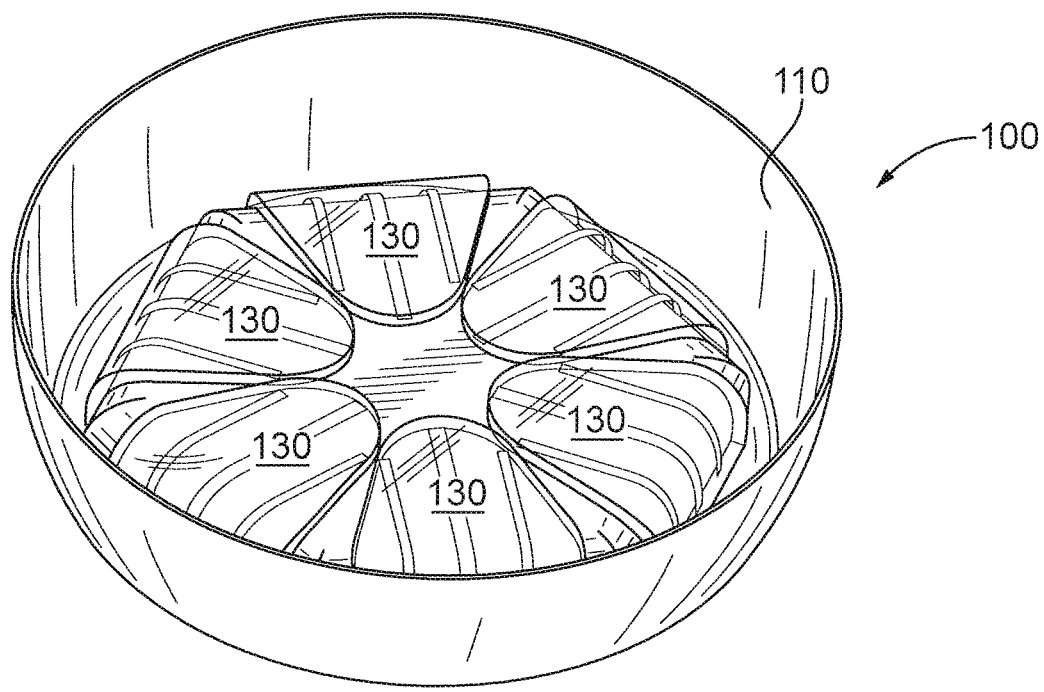
FIG. 2 is a top perspective view of the HVAC register airflow control system shown in FIG. 1.

FIGS. 2 and 3 are top perspective views of the HVAC register airflow control system 100. The HVAC register airflow control system 100 includes at least one damper 130 and in the shown embodiment, six dampers 130. The damper can be in the shape of a blade and can be actuated to achieve shape change. The dampers 130 each comprise a shape memory material and are configured to interact with the air outlets 112. The damper 130 has a first operative configuration (as shown in FIG. 2) and a second operative configuration (as shown in FIG. 3), both configurations being provided by the shape memory material, which will described later. In the first operative configuration, the dampers 130 interact with the air outlets 112 to prevent the airflow supplied by the air source from entering the enclosed space. In the second operative configuration, the dampers 130 interact with the air outlets 112 to permit the airflow supplied by the air source to enter the enclosed space.

In addition, the dampers switch between the first operative configuration and the second operative configuration based on the control signal generated by the controller in response to the occupancy information acquired by the detection sensor 120. Furthermore, the multiple dampers 130 can be controlled to switch between the first operative configuration and the second operative configuration individually and independently from each other. Alternatively, the multiple dampers 130 can be controlled to switch between the first operative configuration and the second operative configuration collectively.

In the shown embodiment, the HVAC register airflow control system 100 further includes a support 140 for supporting the one or more dampers 130. The support 140 is best shown in FIGS. 4 and 5. The support 140 includes a plate 142, which has a shape or profile that matches with the inner shape or profile of the housing 110, such that the plate 142 can be placed within the housing 110 in a sealed manner. The support 140 further includes a frame 144, which defines therein at least one through opening 146. In operation, the airflow supplied by the air source passes the through opening 146 and subsequently, exits the at least one air outlet 112. In the shown embodiment, six through openings 146 are defined by the frame 144. The dampers 130 each interact with a respective through opening 146, by switching between the first operative configuration (shown in FIG. 4) and the second operative configuration (shown in FIG. 5). In the first operative configuration, the dampers 130 cover the through openings 146, respectively, to prevent the air flow from entering the enclosed space. In the second operative configuration, the dampers 130 maintain clear the through openings 146, respectively, to permit the air flow to enter the enclosed space.

The frame 144 further includes a center section 148, which is substantially surrounded by the through openings 146. The center section 148 provides a base, on which the detection sensor 120 and its associated circuits, and other electronic components can be mounted. The frame 144 can be formed of polydimethylsiloxane.

For the purpose of clarity, FIGS. 4 and 5 illustrate operation scenarios, in which all the through opening 146 are covered or not covered simultaneously. However, the scope of present disclosure is not limited to the shown embodiment. For example, within the scope of the disclosure, any suitable number of the through openings 146 can be selectively covered by the respective dampers 130 as controlled by the controller, while the rest of the through openings 146 can be selectively maintained clear by the respective dampers 130 as controlled by the controller. Furthermore, each damper 130 can be controlled to switch between the first operative configuration thereof and the second operative configuration thereof individually and independently from each other.

The controller of the HVAC register airflow control system 100 can be in wired or wireless communication with the building automation system (BAS) of the enclosed space. For example, based on the occupancy information provided by the detection sensor 120 (which may include the number of one or more occupants within the enclosed space, the positions of the one or more occupants within the enclosed space, the moving directions of the one or more occupants and so on), the controller can also communicate with the building automation system to control the air source for supplying an airflow with a predetermined temperature, a predetermined blowing speed and so on. This operation of the controller can be applied in addition to the control operation of the dampers, for the purpose of achieving further energy-efficiency and/or desirable comfort level of the enclosed space. For example, the controller can include a micro control unit (MCU). The MCU, without it associated electronics, can be located within the housing 110, on or above the center section 148 of the frame 140. The control function of the controller or MCU can be achieved wirelessly, for example, through Zigbee, Z-Wave or Bluetooth communication protocol with the BAS.

Figure 6:
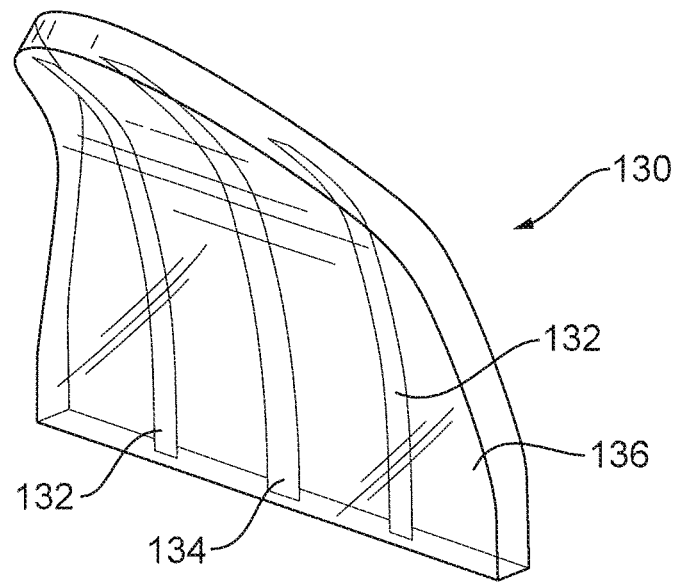
FIG. 6 is a perspective view of a component of the HVAC register airflow control system shown in FIG. 1.
Figure 7:
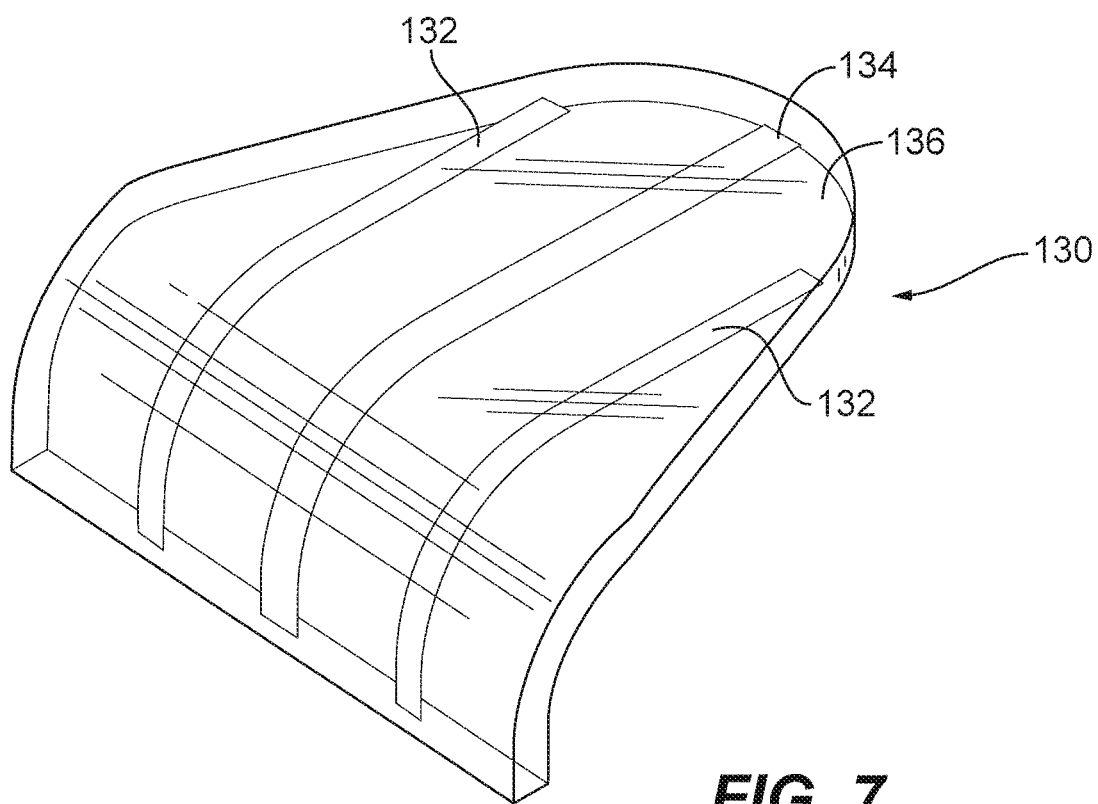
FIG. 7 is an alternative perspective view of the component of FIG. 6.

FIGS. 6 and 7 illustrate the structure of the damper 130. The damper 130 includes a shape memory material, such as, a shape memory alloy (SMA). The shape memory material has the ability to memorize or retain its previous form, when the shape memory material is subjected to certain stimulus, such as, thermo-mechanical or magnetic variations. The damper 130 can includes one or more Ni—Ti SMA strips 132. The Ni—Ti SMA strips 132 can be pre-trained (which will be described later) and wrapped around by a Ni—Cr resistive wire that is coated with thermally conductive and electrically isolating material. For example, a pair of SMA strips, including a first Ni—Ti SMA strip 132 and an antagonistic Ni—Ti SMA strip 132', can be included to the damper 130.

The damper 130 further includes at least one piezoelectric shape sensor 134 bonded to the at least one Ni—Ti SMA strip 132. The piezoelectric shape sensor 134 and the Ni—Ti SMA strip 132 together define the first operative configuration and the second operative configuration of the damper 130. The piezoelectric shape sensor 134 is capable of providing feedback on the shape of the damper 130 to achieve a precise airflow control.

The damper 130 also includes a silicone rubber 136, in which the Ni—Ti SMA strip 132 and the piezoelectric shape sensor 134 are embedded. When manufacturing the damper 130, a 3D printed mold can be filled with silicone rubber materials and subsequently, the SMA strips can be inserted into the mold. Finally, a de-molding process yields a fully integrated damper. Multiple dampers can be manufactured simultaneously and integrally through the same process. In addition, the support 140 and the dampers 130 can be manufactured integrally or independently.

Alternatively or additionally, one or more thermal sensors can be bonded to the Ni—Ti SMA strips 132 to replace or supplement the piezoelectric shape sensor 134, for the purpose of providing shape control of the dampers 130.

Figure 8:
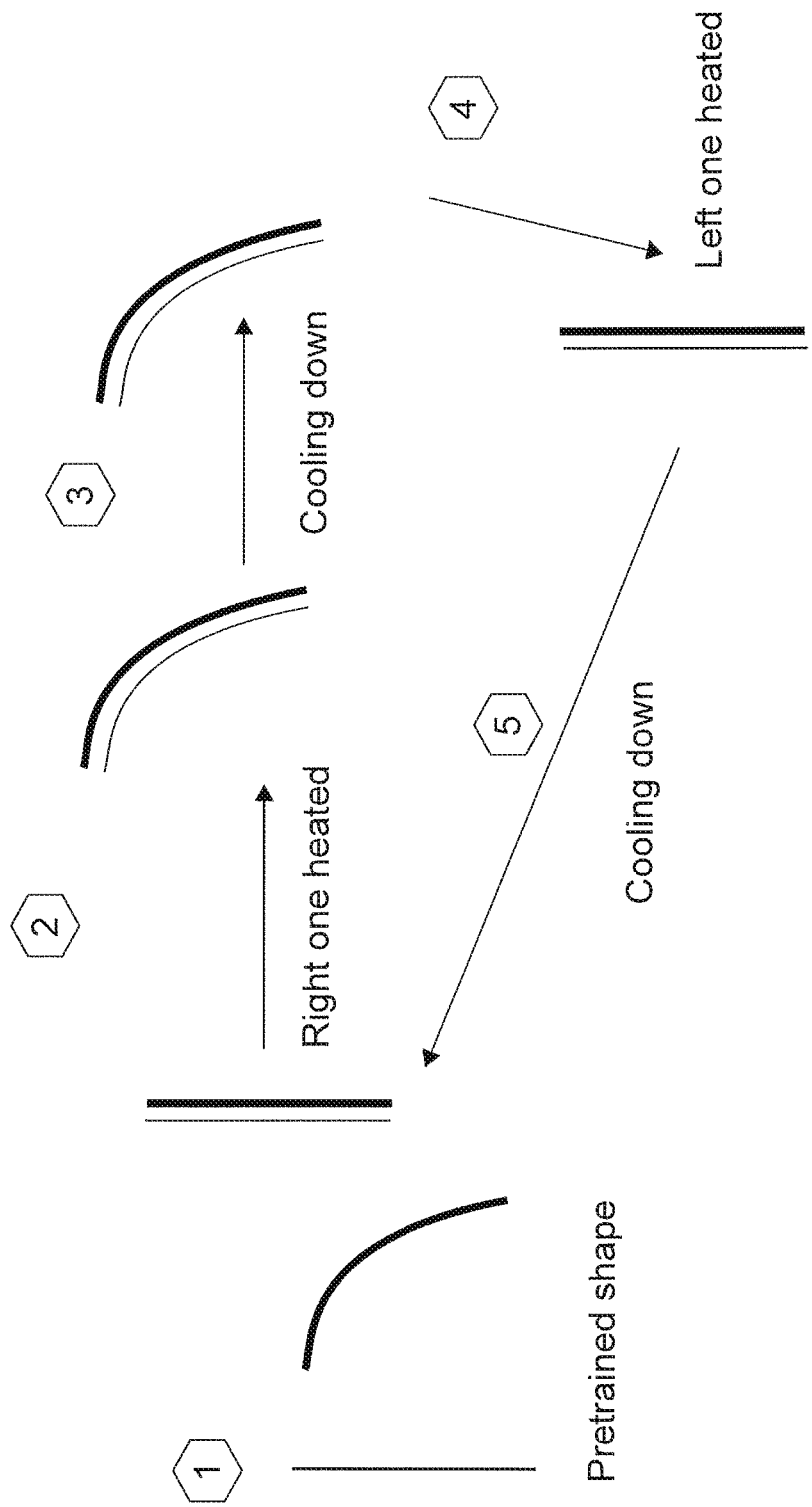
FIG. 8 is a schematic diagram showing the working principle of the component shown in FIG. 6.

The principle of the damper 130, including a shape memory material, is based on the shape memory effect, as shown FIG. 8. Initially, both a left shape memory material and a right shape memory material are provided with a respective pre-trained shape and bonded together to provide a first shape of the bonded shape memory materials. Specifically, the left shape memory material is pre-trained to have a straight shape and the right shape memory material is pre-trained to have a curved shape. Subsequently, the right shape memory material can be, for example, heated to achieve a second shape of the bonded shape memory materials, and this process can be done in response to a first control signal to switch the operative configuration of the damper 130. Subsequently, the bonded shape memory materials can be cooled down to retain the shape of the bonded shape memory materials. Subsequently, the left shape memory material can be, for example, heated to change the second shape of the bonded shape memory materials to the first shape of the bonded shape memory materials, and this process can be done in response to a second control signal to switch the operative configuration of the damper 130. Other suitable operational principles of the damper 130 are within the scope of the present disclosure.

Figure 9:
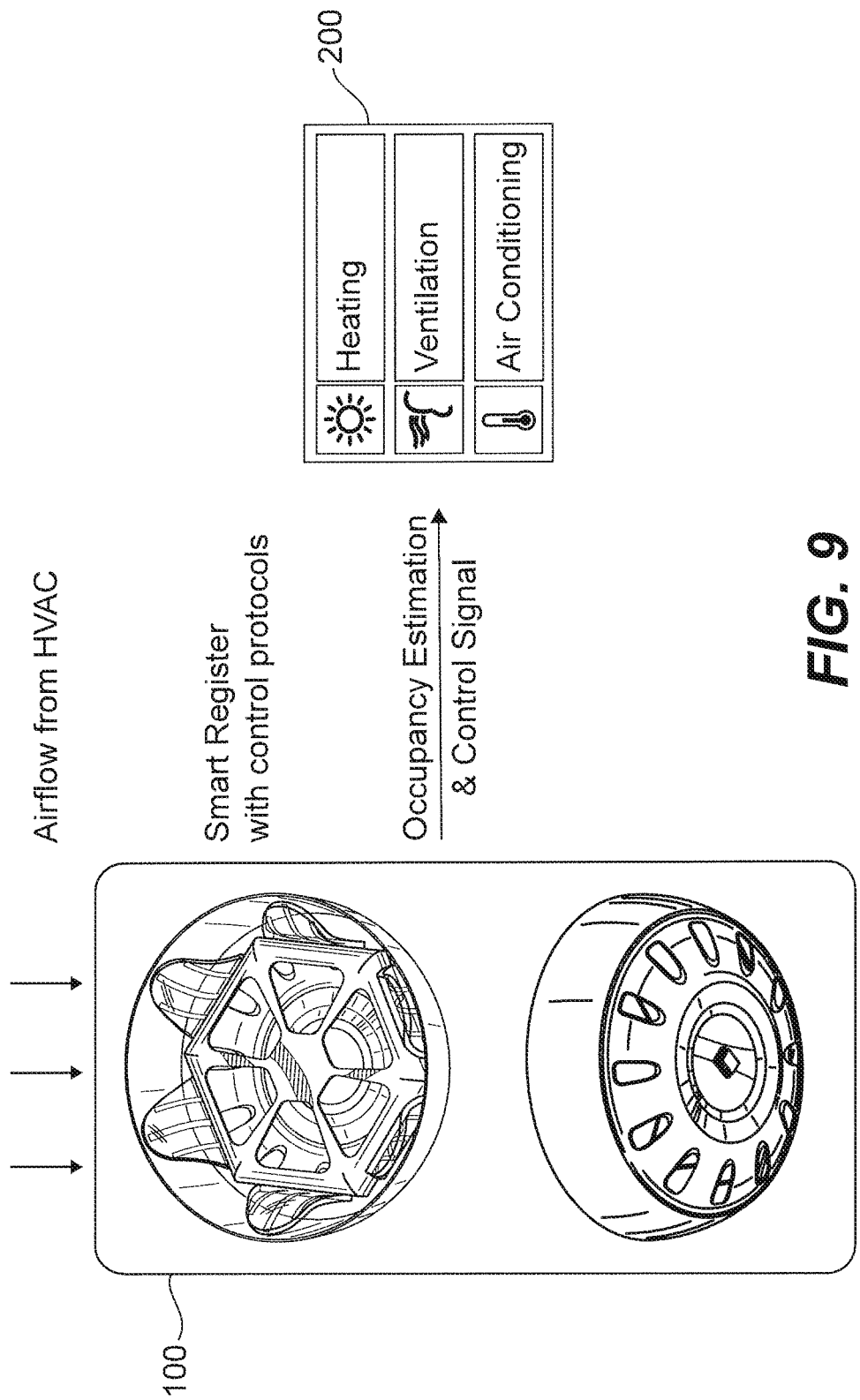
FIG. 9 is a schematic diagram showing the communication and interaction between the HVAC register airflow control system and a building automation system.

FIG. 9 is a schematic diagram showing the communication and interaction between the HVAC register airflow control system 100 and a BAS 200 of the enclosed space. Based on the occupancy estimation the controller of the HVAC register airflow control system can send control signals to the BAS for adjusting the operation of the HVAC, which can be in turn reflected in the airflow provided by the HVAC.

Certain advantages can be provided by the embodiments of the present disclosure. For example, the register airflow control system can be automatically controlled based on the occupancy information acquired by the detection sensor. The detection sensor can localize and track individual occupants (particularly, humans) and differentiate and exclude other relatively small hot objects from the occupants. The detection sensor can also estimate the number of occupants. The register airflow control system can, based on the occupancy information, modulate the speed and angle of airflow to achieve a high energy efficiency. The information can also be compiled and transmitted to building controls, such as a thermostat or a BAS. Furthermore, the register airflow control system does not include the traditional damper parts, such as, motors and gears, which saves space and cost.

The register airflow control system can also be controlled automatically based on occupancy information and room temperature. The embedded piezoelectric sensors provide position feedback, which ensures the accuracy control of the on/off of the dampers. The register airflow control system can communicate wirelessly with other smart register systems and building HVAC controller to maintain indoor human comfort and lower energy cost.

Furthermore, the register airflow control system provides an integrated system with both wind speed control and occupancy detection functions. The whole vent register is divided into two sections. One section is provided with smart dampers around the center, which can be controlled independently. The other section provides a base for installation of occupancy sensors, with associated circuits and other components.

While the fundamental novel features of the disclosure as applied to various specific embodiments thereof have been shown, described and pointed out, it will also be understood that various omissions, substitutions and changes in the form and details of the devices illustrated and in their operation, may be made by those skilled in the art without departing from the spirit of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or embodiment of the disclosure may be incorporated in any other disclosed or described or suggested form or embodiment as a general matter of design choice. It is the intention, therefore, to be limited only as indicated by the scope of the claims appended hereto.

What is claimed is:

1. An HVAC register airflow control system used for an enclosed space, comprising:
    a housing in fluid communication with an air source for supplying an airflow, wherein the housing comprises a plurality of air outlets to the enclosed space;
    a detection sensor configured to detect occupancy information of the enclosed space;
    a controller in wired or wireless communication with the detection sensor and configured to generate a control signal based on the occupancy information of the enclosed space; and
    a plurality of dampers each comprising a shape memory material and configured to interact with the plurality of air outlets respectively,
        wherein each damper comprises a first operative configuration and a second operative configuration both provided by the shape memory material,
        wherein in the first operative configuration, said each damper interacts with a respective air outlet to prevent the airflow supplied by the air source from entering the enclosed space,
        wherein in the second operative configuration, said each damper interacts with the respective air outlet to permit the airflow supplied by the air source to enter the enclosed space, and
        wherein said each damper switches between the first operative configuration and the second operative configuration based on the control signal.

2. The HVAC register airflow control system according to claim 1,
    wherein the housing is substantially circular.

3. The HVAC register airflow control system according to claim 2, wherein both the plurality of air outlets and the plurality of dampers are centro-symmetrical with respect to the center of the circular housing.

4. The HVAC register airflow control system according to claim 2, wherein the detection sensor is at a lower end of the housing and aligned with the center of the circular housing.

5. The HVAC register airflow control system according to claim 2, wherein the controller is configured to generate the control signal for controlling the plurality of dampers individually.

6. The HVAC register airflow control system according to claim 1,
    further comprising a support sealingly provided within the housing;
    wherein the support comprises a plurality of through openings and the airflow supplied by the air source exits the plurality of air outlets after the airflow passes the plurality of through openings respectively;
    wherein the plurality of dampers are mounted to the support and within the housing; and
    wherein said each damper interacts with the respective air outlet by covering a respective through opening in the first operative configuration thereof and maintaining clear the respective through opening in the second operative configuration thereof.

7. The HVAC register airflow control system according to claim 6,
    wherein the housing is substantially circular.

8. The HVAC register airflow control system according to claim 7, wherein both the plurality of air outlets, the plurality of through openings and the plurality of dampers are centro-symmetrical with respect to the center of the circular housing.

9. The HVAC register airflow control system according to claim 7, wherein the detection sensor is at a lower end of housing and aligned with the center of the circular housing.

10. The HVAC register airflow control system according to claim 7, wherein the controller is configured to generate the control signal for controlling the plurality of dampers individually.

11. The HVAC register airflow control system according to claim 1, wherein said each damper comprises at least one Ni—Ti shape memory strip and at least one Ni—Cr resistive wire wrapping around the at least one Ni—Ti shape memory strip.

12. The HVAC register airflow control system according to claim 11, wherein said each damper further comprises:
    at least one piezoelectric shape sensor bonded to the at least one Ni—Ti shape memory strip, wherein the at least one piezoelectric shape sensor and the at least one Ni—Ti shape memory strip together define the first operative configuration and the second operative configuration of the at least one damper; and
    a silicone rubber, wherein the at least one piezoelectric shape sensor and the at least one Ni—Ti shape memory strip are embedded in the silicone rubber.

13. The HVAC register airflow control system according to claim 1,
    further comprising a building automation system in wired or wireless communication with the controller; and
    wherein upon receiving the control signal from the controller, the building automation system is configured to control the air source for supplying an airflow with at least one of a predetermined temperature and a predetermined blowing speed.

14. The HVAC register airflow control system according to claim 1,
    wherein the detection sensor comprises a thermopile detection sensor;
    wherein the thermopile detection sensor comprises a plurality of pixel infrared sensor arrays and a thermistor; and
    wherein the thermopile detection sensor reads temperatures and processes thermal image information to provide the occupancy information comprising at least one of the number of one or more occupants within the enclosed space, the positions of the one or more occupants within the enclosed space, and the moving directions of the one or more occupants.

15. A method of controlling airflow in an enclosed space by using an HVAC register, the method comprising:
- detecting occupancy information of the enclosed space;
- generating a control signal based on the detected occupancy information; and
- based on the control signal, switching at least one damper between a first operative configuration thereof and a second operative configuration thereof,
- wherein the at least one damper comprises a shape memory material for providing the first operative configuration and the second operative configuration,
- wherein the at least one damper is configured to interact with at least one air outlet in fluid communication with an air source for supplying an airflow into the enclosed space,
- wherein in the first operative configuration, the at least one damper interacts with the at least one air outlet to prevent the airflow from entering the enclosed space and in the second operative configuration, the at least one damper interacts with the at least one air outlet to permit the airflow to enter the enclosed space, and wherein the detection sensor comprises a thermopile detection sensor;
- wherein the thermopile detection sensor comprises a plurality of pixel infrared sensor arrays and a thermistor; and
  - wherein the thermopile detection sensor reads temperatures and processes thermal image information to provide the occupancy information comprising at least one of the number of one or more occupants within the enclosed space, the positions of the one or more occupants within the enclosed space, and the moving directions of the one or more occupants,
- wherein the at least one air outlet includes a plurality of air outlets;
- wherein the at least one damper comprises a plurality of dampers each comprising the shape memory material and the first operative configuration and the second operative configuration provided by the shape memory material;
- wherein each of the plurality of dampers interacts with a respective air outlet; and
- wherein based on the control signal, each of the plurality of dampers independently switches between the first operative configuration thereof and the second operative configuration thereof.

16. The method of claim 15, wherein the occupancy information comprises at least one of the number of one or more occupants within the enclosed space, the positions of the one or more occupants within the enclosed space, and the moving directions of the one or more occupants.

17. The method of claim 15, further comprising:
- upon receiving the control signal, controlling the air source for supplying the airflow with at least one of a predetermined temperature and a predetermined blowing speed.

18. The method of claim 17, wherein the controlling the air source for supplying the airflow with at least one of the predetermined temperature and the predetermined blowing speed is implemented by a building automation system associated with the enclosed space.

19. An HVAC register airflow control system used for an enclosed space, comprising:
- a housing in fluid communication with an air source for supplying an airflow, wherein the housing comprises at least one air outlet to the enclosed space;
- a detection sensor configured to detect occupancy information of the enclosed space;
- a controller in wired or wireless communication with the detection sensor and configured to generate a control signal based on the occupancy information of the enclosed space; and
- at least one damper comprising a shape memory material and configured to interact with the at least one air outlet,
  - wherein the at least one damper comprises a first operative configuration and a second operative configuration both provided by the shape memory material,
  - wherein in the first operative configuration, the at least one damper interacts with the at least one air outlet to prevent the airflow supplied by the air source from entering the enclosed space,
  - wherein in the second operative configuration, the at least one damper interacts with the at least one air outlet to permit the airflow supplied by the air source to enter the enclosed space,
  - wherein the at least one damper switches between the first operative configuration and the second operative configuration based on the control signal, and
  - wherein the at least one damper comprises at least one Ni—Ti shape memory strip and at least one Ni—Cr resistive wire wrapping around the at least one Ni—Ti shape memory strip.

* * * * *